(12) United States Patent
Martinez Rueda et al.

(10) Patent No.: US 7,909,286 B2
(45) Date of Patent: Mar. 22, 2011

(54) SUPPORT SYSTEM FOR AUXILIARY POWER UNIT

(75) Inventors: José Román Martinez Rueda, Aranjuez (ES); José Alberto Rojo Carrión, Madrid (ES); José Luis Sen Pacios, Fuenlabrada (ES); Juan Pablo Melián Brinquis, Madrid (ES); Nicolás Rojo Saiz, Madrid (ES); David Martin Calvo, Madrid (ES); Steffan Prys Thomas, Madrid (ES); Antonio Márquez Gavilán, Getafe (ES); María Aranzazu García Patino, Madrid (ES)

(73) Assignee: Airbus Operations, S.L., Madrid (ES)

( * ) Notice: Subject to any disclaimer, the term of this patent is extended or adjusted under 35 U.S.C. 154(b) by 835 days.

(21) Appl. No.: 11/499,384

(22) Filed: Aug. 4, 2006

(65) Prior Publication Data
US 2007/0120037 A1    May 31, 2007

(30) Foreign Application Priority Data

Oct. 28, 2005  (ES) ................................. 200502626

(51) Int. Cl.
*B64D 41/00*  (2006.01)
(52) U.S. Cl. ........................................... 244/58; 244/54

(58) Field of Classification Search .................... 244/54, 244/58; 248/554–557; 60/796, 797
See application file for complete search history.

(56) References Cited

U.S. PATENT DOCUMENTS

| 3,151,464 | A  | * | 10/1964 | Sato et al. .................... 405/236 |
| 3,204,897 | A  | * | 9/1965  | Lawrence ..................... 248/554 |
| 6,247,668 | B1 | * | 6/2001  | Reysa et al. .................... 244/58 |
| 6,581,874 | B2 | * | 6/2003  | Lemire et al. ................... 244/54 |
| 2006/0032974 | A1 | * | 2/2006 | Williams ........................ 244/58 |
| 2006/0144050 | A1 | * | 7/2006 | Williams ........................ 60/796 |
| 2006/0273221 | A1 | * | 12/2006 | Olsen et al. .................... 244/58 |

* cited by examiner

*Primary Examiner* — Joshua J Michener
(74) *Attorney, Agent, or Firm* — Klauber & Jackson LLC

(57) ABSTRACT

Support system suitable for sustaining an auxiliary power unit of an aircraft to a fixed structure (2) belonging to a compartment of the auxiliary power unit (6) of the aircraft. The support system is made in a high mechanical strength material and with high resistance to ignition, and comprises three fittings (3, 4, 5) two of which are frusto-conical and one with a substantially cylindrical. Fittings (3, 4, 5) being able to be hollow and being able to comprise an array of lateral ribs. Each one of them presenting a first end (7) comprising means of attachment of the support system (8) to the fixed structure (2) and a second end (9) comprising means of securing of the support system (8) which are joined to the auxiliary power unit (1) in the periphery of the extension of said auxiliary power unit (1).

12 Claims, 4 Drawing Sheets

SUPPORT SYSTEM FOR AUXILIARY POWER UNIT

CROSS REFERENCE TO RELATED APPLICATIONS

The present application claims priority from Spanish Application Serial No. P200502626, filed on Oct. 28, 2005. Applicants claim priority under 35 U.S.C. §119 as to the said Spanish application, and the entire disclosure of said application is incorporated herein by reference in its entirety.

FIELD OF THE INVENTION

This invention belongs to the field of support systems for large and heavy pieces, said support systems presenting characteristics of high mechanical strength and high resistance to ignition. In particular, the invention applies to the sector of support system for auxiliary power units employed in the aeronautical sector.

STATE OF THE ART PRIOR TO THE INVENTION

In the field of aeronautics, the auxiliary power unit is usually located in the tail of the aircraft and can weigh more than 600 kg. Also, owing to the operation of that engine, high temperatures can be reached in the compartment where it is housed, up to 200° C.

For this reason, the materials which the support systems of the auxiliary power unit are made of, have to have a high mechanical strength for properly supporting the weight of the engine, plus the stresses originated and the vibrations that are produced, together with the fatigue caused by those vibrations.

In addition, these materials must display good behaviour towards high temperatures, with very little reduction in their mechanical strength. Also, these materials must comply with the requirement of resistance to fire for a prolonged period of time, which will be at least 15 minutes, having to withstand the loads required in this special case of fire.

The support systems employed so far have used a complex framework of bars for providing adequate securing of the engine and the necessary characteristics mentioned above.

The drawback of these conventional systems is precisely their complexity and their size, which gives rise to a complex and costly manufacturing and assembly process, with a large number of pieces being used, in addition to creating difficult access to the auxiliary power unit compartment for inspection and maintenance, both of the auxiliary power unit and of the support system itself, as well as costly repair when this support system deteriorates.

It is therefore desirable to have a simplified system, with the necessary requirements for the correct support of the auxiliary power unit which will solve the problems existing in the state of the art.

DESCRIPTION OF THE INVENTION

The present invention has the aim of overcoming the drawbacks of the state of the art pointed out above by means of an support system for auxiliary power unit for an aircraft. The objective of this invention is the perfect securing of the auxiliary power unit of an aircraft in the interior of the chamber where said auxiliary power unit is housed, along with improving the behaviour towards fatigue of currently existing structures, and facilitating their maintenance.

Said support system for auxiliary power unit comprises a set of at least three fittings made of an ignition resistant material, in order to prevent those fittings from being able to catch fire so that they can support the loads required in the event of fire, and also for being able to withstand the high temperatures that can be reached in the vicinity of the auxiliary power unit, without losing any of their properties.

The fittings present a shape that is frustro-conical. The main advantage of this geometry is ease of manufacture, plus the elimination of edges where stresses can accumulate and cause the fittings to break.

One of the ends of the said fittings has means of attachment by which they are attached to the fixed structure of the compartment where the auxiliary power unit is housed, and at the other end they have means of securing for the auxiliary power unit via which said auxiliary power unit is efficiently and simply supported.

The materials used for producing the fittings have high thermal resistance and high resistance to vibration and fatigue, as might be titanium or steel for example, and in a preferred embodiment the fittings are hollow and comply with the requirements of high resistance at the same time as being light and having a lower cost.

Said support system can be designed in such a way that the set of fittings are attached to the lower surface of the auxiliary power unit compartment and said auxiliary power unit rests on the set of fittings, or in such a way that the set of fittings is attached to the upper surface of the auxiliary power unit compartment and said auxiliary power unit hangs from the set of fittings. The advantage of the second embodiment is greater ease of access to the interior of the compartment.

The arrangement of the set of fittings can be carried out in various ways, though in a preferred embodiment of the invention said set of fittings are located in such a way that they are joined to the auxiliary power unit in the periphery of the latter, thereby achieving greater securing and stability for that engine.

In said preferred embodiment of the invention, three fittings have been used, two of them being located in the forward zone of the engine and the third in the rear zone, thereby achieving a complete securing that provides adequate stability using a minimum number of securing points.

In order to achieve the optimum stability, the fittings can be inclined and/or curved, so that they can be correctly adapted both to the fixed structure and to the surface of the engine.

Also, in order to increase the strength of the fittings, in a preferred embodiment they display a set of ribs running along their entire length.

In addition, in a preferred embodiment of the support system, the fittings display certain adapters for bars, thereby making the support system compatible with the means of attaching of the auxiliary power unit consisting of conventional bars, as have been used so far.

Figure 1:
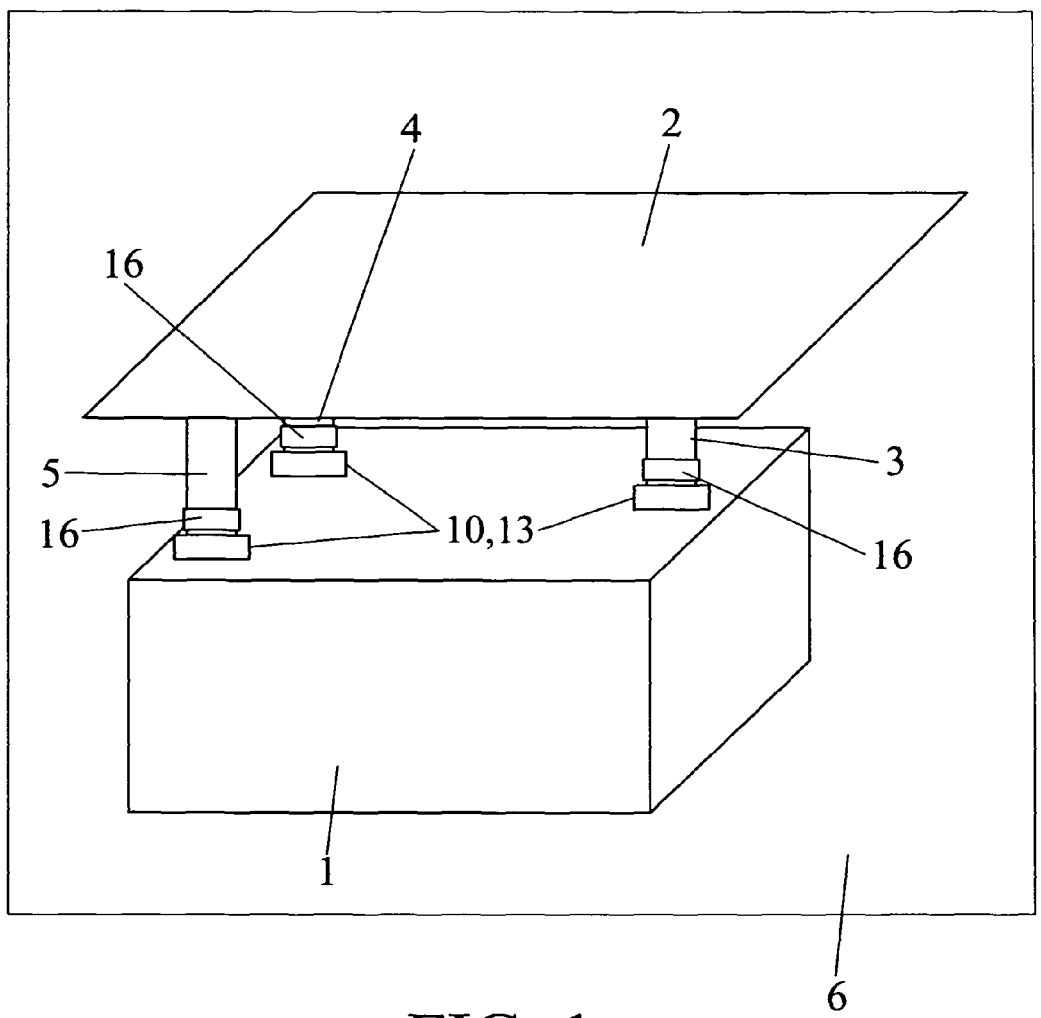
FIG. 1 is a schematic view of the fittings of the invention, joined to fixed structure and to the auxiliary power unit in the auxiliary power unit compartment.

Appearing in these figures are numerical references denoting the following elements:

1. Auxiliary power unit
2. Fixed structure
3. Rear fitting
4. First forward fitting
5. Second forward fitting
6. Auxiliary power unit compartment
7. First end of the fittings
8. Means of attachment of the support system
9. Second end of the fittings
10. Means of securing of the support system
11. Bolts
12. Means of attachment of the fixed structure
13. Means of securing of the auxiliary power unit
14. Bolt-holes
15. Lateral ribs
16. Adapter for bars

MODES OF EMBODIMENT OF THE INVENTION

Figure 2:
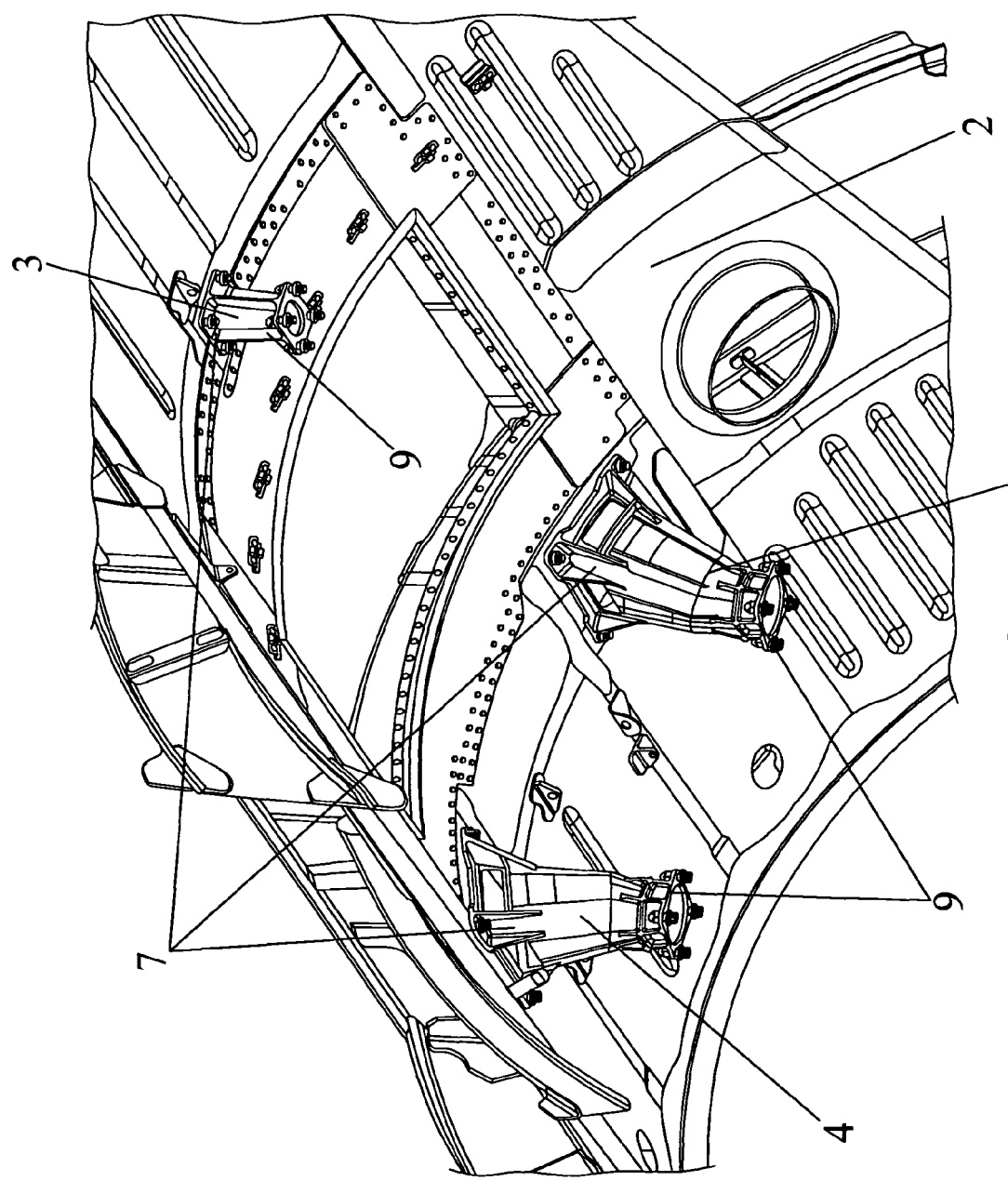
FIG. 2 is a detailed view of a preferred embodiment of the invention showing the rear fitting and the forward fittings.
Figure 3:
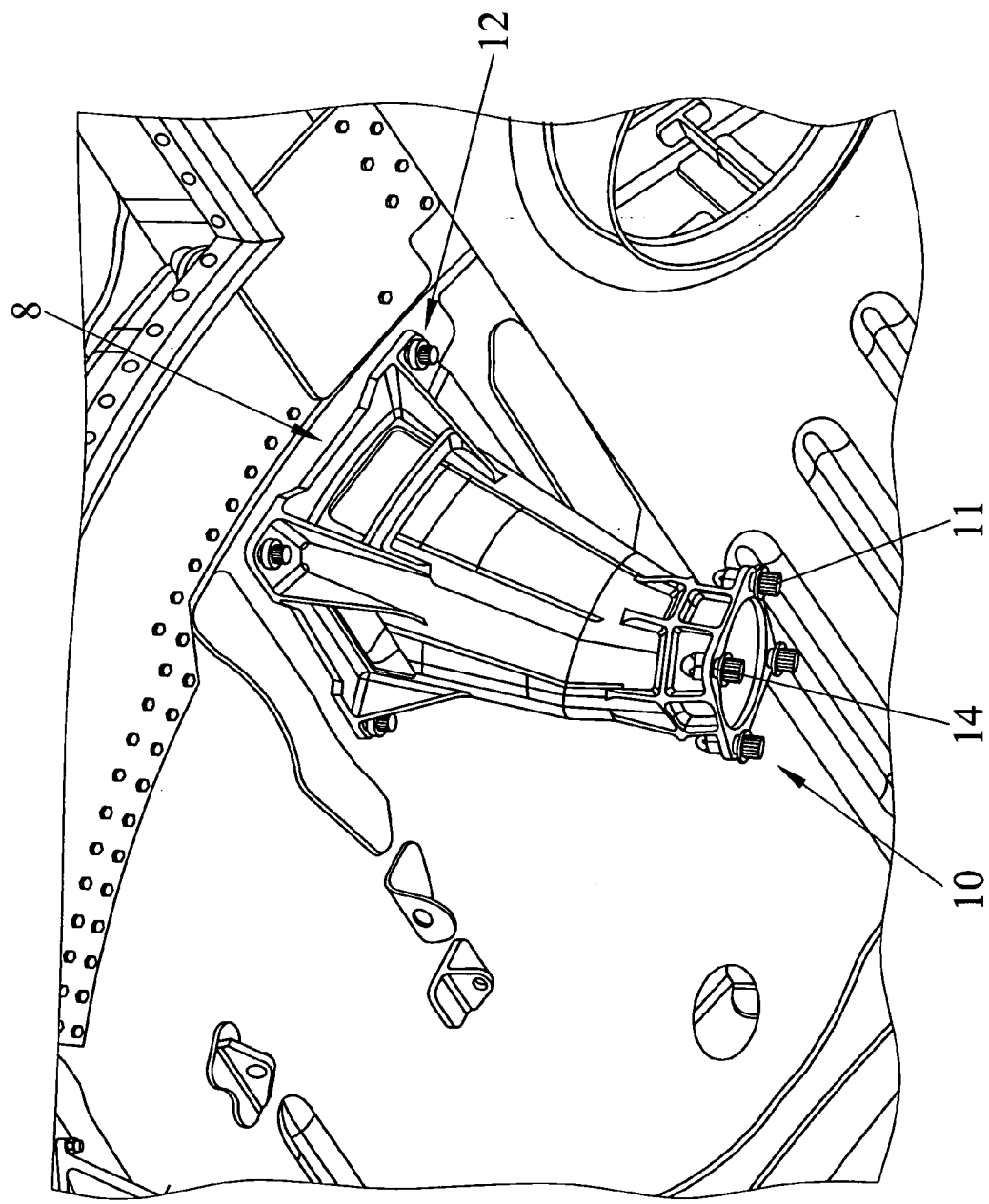
FIG. 3 is a detailed view of one of the forward fittings of the preferred embodiment of the invention shown in FIG. 2.
Figure 4:
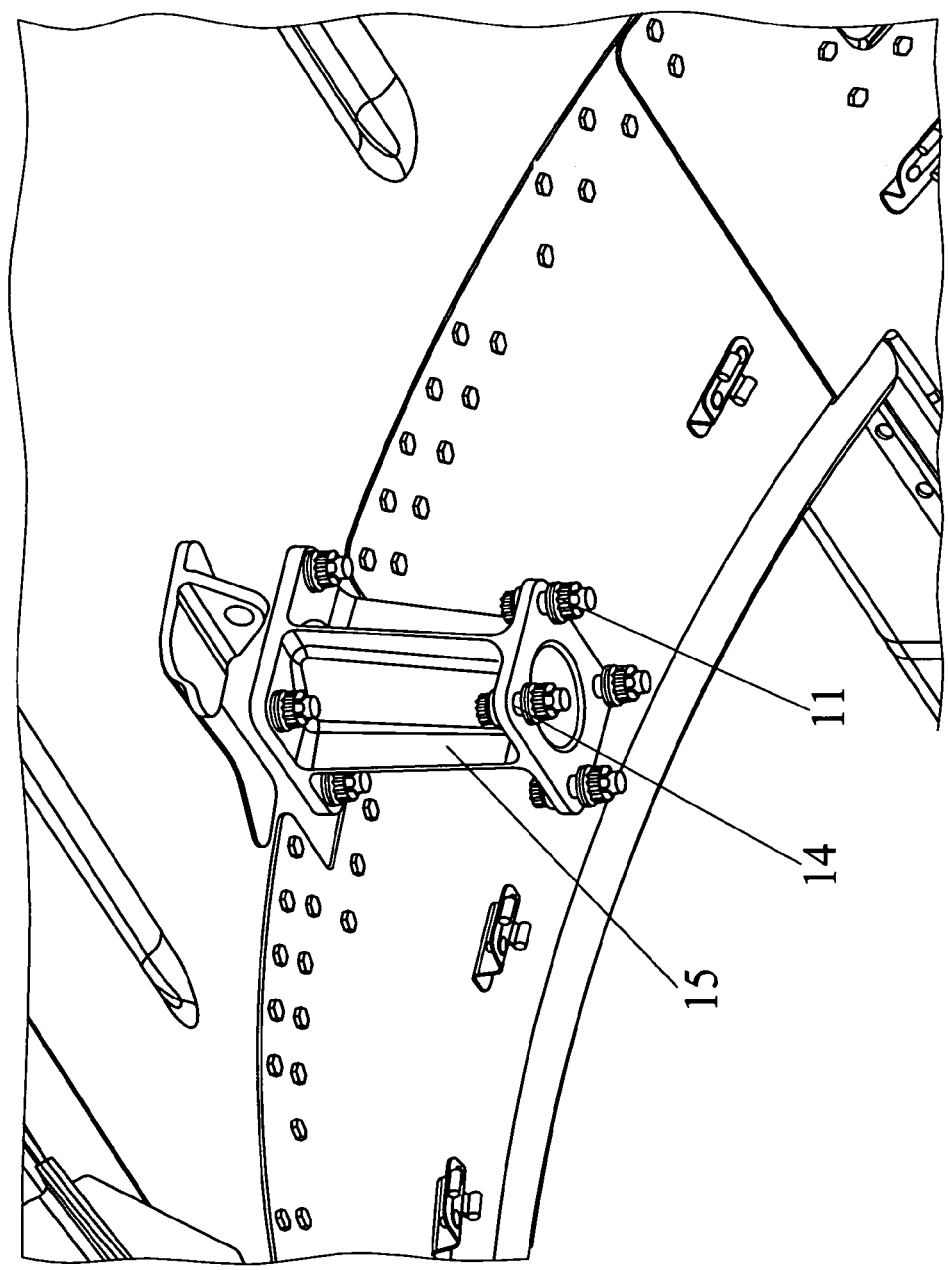
FIG. 4 is a detailed view of the rear fitting of the preferred embodiment of the invention shown in FIG. 2.

FIGS. 1 and 2 show an embodiment of the invention. The support system for auxiliary power unit sustains an auxiliary power unit 1 of an aircraft to a fixed structure 2 of a compartment 6 where that auxiliary power unit 1 is housed, said auxiliary power unit compartment 6 usually being located in the tail of the aircraft. The auxiliary power unit compartment 6 reaches high temperatures during the working time of the auxiliary power unit 1, up to 200° C. For this reason, the support system for auxiliary power unit is made of a high mechanical strength material, and also resistant to ignition in order to withstand the loads required in case of fire, and so that it can also withstand high temperatures without losing its characteristics of high mechanical strength.

Obviously, the support system for auxiliary power unit presents means of attachment of the support system 8 that are complementary to the means of attachment of the fixed structure 12 provided in the fixed structure 2, by means of which said support system is attached to said fixed structure 2, and it also presents means of securing of the support system 10 that are complementary to the means of securing of the auxiliary power unit 13 provided in the auxiliary power unit 1, by means of which said support system is secured to said auxiliary power unit 1. The support system of the present invention is characterized in that it comprises a set of at least three fittings, 3, 4, 5 two of which are frusto-conical and one is substantially cylindrical shape, each of them consisting of a first end 7 where the means of attachment of the support system 8 are provided, and a second end 9 where the means of securing of the support system 10 are provided, in such a way that the first end 7 is attached to the fixed structure of the auxiliary power unit compartment 6 and the second end 9 is joined to the auxiliary power unit 1.

The advantage of this embodiment of the support system for auxiliary power unit compared to conventional systems for securing by means of a framework of bars existing in the state of the art is the greater simplicity and lightness shown by this system of fittings, along with the reduction in the number of pieces necessary for correct securing of the auxiliary power unit.

Moreover, said system presents the advantage of greater accessibility for its inspection and maintenance, avoiding the complicated structures of bars and lack of space in the auxiliary power unit compartment 6 existing in conventional methods. All this leads to an increase in the comfort of those maintenance tasks and a reduction in the time needed for performing them, which implies a lowering of costs.

The advantage of the frustro-conical geometry of the fittings 3, 4, 5 is the ease of manufacture, along with the elimination of edges where stresses can accumulate and cause breakage of the fittings 3, 4, 5.

In a preferred embodiment, the fittings 3, 4, 5 are hollow. In this way, as the fittings 3, 4, 5 are manufactured with high mechanical strength materials, they will comply with the demands of resistance to vibration and fatigue even when they are hollow, with the added advantage of the absence of unnecessary material, which will reduce costs as well as reducing the weight of the support system and increasing its efficiency.

In one embodiment of the invention, the fixed structure 2 to which the first end 7 of each of the fittings 3, 4, 5 is attached is located on the lower surface of the auxiliary power unit compartment 6 and the second end 9 of each of the fittings 3, 4, 5 is joined to the lower surface of the auxiliary power unit 1 in such a way that said auxiliary power unit 1 rests on the fittings 3, 4, 5.

In a preferred embodiment of the invention, the fixed structure 2 to which the first end 7 of each of the fittings 3, 4, 5 is attached is located on the upper surface of the auxiliary power unit compartment 6 and the second end 9 of each of the fittings 3, 4, 5 is joined to the upper surface of the auxiliary power unit 1 in such a way that said auxiliary power unit 1 hangs from the fittings 3, 4, 5. The advantage of this embodiment is greater accessibility to the auxiliary power unit compartment 6 for inspection and maintenance operations, given that in the majority of cases the access door to the auxiliary power unit compartment 6 is located in the lower part of the aircraft, so that if the auxiliary power unit 1 is hanging from the support system located on the upper surface of the auxiliary power unit compartment 6, accessibility to said auxiliary power unit compartment 6 will be much greater than if the auxiliary power unit 1 rests on the support system located in the lower part.

In different embodiments, both the number of fittings used and the point of union of those fittings to the auxiliary power unit 1 can vary. Depending on the number of fittings and their arrangement with respect to the auxiliary power unit 1, there exist different embodiments of the invention, such as the arrangement of the fittings in various lines along the auxiliary power unit 1 or the regular arrangement of them along said auxiliary power unit.

In no matter what embodiment of the invention, the minimum number of fittings 3, 4, 5 that are needed is three, in order to provide an adequate stability to the securing of the engine, though a larger number of them can be used.

In one of the embodiments of the invention, the support system comprises three fittings 3, 4, 5, which provide adequate stability, with the additional advantage of providing a simple low-cost structure in relation to other more complex arrangements. Moreover, in that embodiment of the invention, the fittings 3, 4, 5 are arranged in such a way that they are not in line, and they are joined to the auxiliary power unit 1 in the periphery of its extension, providing greater stability for that auxiliary power unit 1 than with other arrangements.

In a preferred embodiment of the invention, the fittings 3, 4, 5 comprise at least one rear fitting 3 which is joined to the rear part of the auxiliary power unit 1, and a first forward fitting 4 and a second forward fitting 5 which are joined to the forward part of that auxiliary power unit 1. The advantage of this arrangement is the perfect securing of the auxiliary power unit 1 with the minimum number of attachment points in addition to adequate absorption of the vibrations produced and the stresses originated by the displacement of the aircraft.

In said preferred embodiment of the invention, the first forward fitting 4 and the second forward fitting 5 display a slight curvature so that, in spite of the curvature of the upper surface of the auxiliary power unit compartment 6 where the fixed structure 2 is provided to which said fittings 3, 4, 5 are attached, said first forward fitting 4 and second forward fitting 5 are arranged in such a way that the means of securing of the support system 10 for the second end 9 are joined to the auxiliary power unit 1 in a horizontal plane, thereby achieving a more secure and more stable securing, and with a better distribution of weight and stresses.

In this first preferred embodiment, the rear fitting 3 is smaller than the first forward fitting 4 and the second forward fitting 5 and, in order to increase the mechanical strength, the said rear fitting displays an array of lateral ribs 15 along the entire length of its outer surface.

In that preferred embodiment, the high resistance material with which the support system for auxiliary power unit is produced is steel, preferably PH13-8Mo steel (1.4534). The advantage of using this material compared to using other high resistance materials, such as titanium, is the lower variation of certain mechanical properties towards an increase in temperature, such as for example resistance and fatigue.

In the different embodiments of the invention, the union of the means of attachment of the support system 8 to the fixed structure 2 is done by means of at least three bolts 11 which are introduced into at least three bolt-holes 14 included in said means of attachment of the support system 8 and at least three bolt-holes 14 complementary to them included in the fixed structure 2. Equally, the union of the means of securing of the support system 10 to the auxiliary power unit 1 is done by means of at least three bolts 11 which are introduced into at least three bolt-holes 14 included in said means of securing of the support system 10 and at least three bolt-holes 14 complementary to them included in the auxiliary power unit 1. The advantage of this embodiment of the means of attachment of the support system 8 and of the means of securing of the support system 10 is the ease of carrying this out and also the ease of inspection and maintenance of them, since all that is necessary for that maintenance is to change the bolts 11 that have deteriorated.

In a preferred embodiment of the support system for auxiliary power unit, the number of bolt-holes 14 included both in the means of attachment of the support system 8 and in the means of securing of the support system 10, as well as in the fixed structure 2 and in the auxiliary power unit 1, is four. With this arrangement, complete security is achieved in the unions with a small number of elements.

In no matter what embodiment of the invention, each of the fittings 3, 4, 5 includes an adapter for bars 16, thereby ensuring that the support system for auxiliary power unit can be used with securing systems already in existence using conventional bars, without having to carry out any adaptation to the auxiliary power unit for its securing.

The invention claimed is:

1. An auxiliary power unit support system which sustains an auxiliary power unit of an aircraft to a fixed structure belonging to an auxiliary power unit compartment of said aircraft, made in a high mechanical strength material, and with high resistance to ignition, which comprises means of attachment of the support system that are complementary to means of attachment of the fixed structure provided in said fixed structure, and means of securing of the support system that are complementary to means of securing of the auxiliary power unit provided in said auxiliary power unit, wherein the auxiliary power unit support system further comprises at least three fittings, two of which are frusto-conical and one is substantially cylindrical, each of the said fittings comprising a first end and a second end, with said means of attachment of the support system being provided in the said first end and said means of securing of the support system being provided in the said second end; being said first end attached to the fixed structure belonging to said auxiliary power unit compartment and being said second end joined to the auxiliary power unit.

2. The auxiliary power unit support system of claim 1, wherein said fittings are hollow.

3. The auxiliary power unit support system of claim 1 wherein the fixed structure to which the first end of each of the fittings is attached is located on an upper surface of the auxiliary power unit compartment, and said second end of each of the fittings is joined to said upper surface of the auxiliary power unit in such a way that said auxiliary power unit hangs from those fittings.

4. The auxiliary power unit support system of claim 1, wherein the fixed structure to which the first end of each of the fittings is attached is located on a lower surface of the auxiliary power unit compartment, and said second end of each of the fittings is joined to said lower surface of the auxiliary power unit; being said auxiliary power unit rested on said fittings.

5. The auxiliary power unit support system of claim 1, wherein the second ends of each of the fittings are joined to the auxiliary power unit in a zone close to a periphery of an extension of said auxiliary power unit and at least one of said fittings is not located in the straight line defined by the rest of the said fittings.

6. The auxiliary power unit support system of claim 1, wherein said fittings comprise at least one rear fitting in such a way that said rear fitting is joined to a rear part of the auxiliary power unit, and at least a first forward fitting and a second forward fitting in such a way that said first forward fitting and second forward fitting are joined to a forward part of said auxiliary power unit.

7. The auxiliary power unit support system of claim 6, wherein said first forward fitting and second forward fitting present a curvature in such a way that the means of securing of the support system of the second end of each of said forward fittings are joined to the auxiliary power unit in a horizontal plane.

8. The auxiliary power unit support system of claim 1, wherein said means of attachment of the support system which attach said fittings to the fixed structure comprise at least three bolt-holes and at least three bolts complementary to said bolt-holes and in turn complementary to at least another three bolt-holes located in the means of attachment of the fixed structure in the fixed structure.

9. The auxiliary power unit support system of claim 1, wherein said means of securing of the support system which join said fittings to the auxiliary power unit comprise at least three bolt-holes and at least three bolts complementary to said bolt-holes and in turn complementary to at least another three bolt-holes located in the means of securing of the auxiliary power unit in the auxiliary power unit.

10. The auxiliary power unit support system of claim 6, wherein the rear fitting presents an array of lateral ribs along the entire length of its outer surface.

11. The auxiliary power unit support system of claim 1, wherein the high resistance material with which the said support system is produced is PH13-8Mo steel (1.4534).

12. The auxiliary power unit support system of claim 1, wherein each of the fittings includes an adapter for bars such that said support system for auxiliary power unit is compatible with auxiliary power unit attachment systems using bars.

* * * * *